(12) United States Patent
Palmer

(10) Patent No.: US 6,219,250 B1
(45) Date of Patent: Apr. 17, 2001

(54) NIGHT VISION BINOCULARS

(75) Inventor: Gary L Palmer, Bellevue, WA (US)

(73) Assignee: ITT Manufacturing Enterprises, Wilmington, DE (US)

( * ) Notice: Subject to any disclaimer, the term of this patent is extended or adjusted under 35 U.S.C. 154(b) by 0 days.

(21) Appl. No.: 09/041,432

(22) Filed: Mar. 12, 1998

Related U.S. Application Data

(62) Division of application No. 08/627,149, filed on Apr. 3, 1996, now Pat. No. 5,847,868.

(51) Int. Cl.[7] .............................. H05K 5/00; H05K 5/06
(52) U.S. Cl. ...................................... 361/752; 174/50.54
(58) Field of Search ................................. 361/752, 753, 361/754, 796, 801, 802, 807, 758; 174/50, 50.5, 50.54; 359/407

(56) References Cited

U.S. PATENT DOCUMENTS 5,822,192 * 10/1998 Hayashi .............................. 361/752

* cited by examiner

Primary Examiner—Jayprakash N. Gandhi
(74) Attorney, Agent, or Firm—Arthur L. Plevy; Buchanan Ingersoll PC

(57) ABSTRACT

A night vision binocular assembly (10) capable of converting low light and infrared energy into a visible image. The night vision binocular assembly (10) includes at least one objective lens assembly (62), image intensifier tube (64), collimator lens assembly (66) and diopter cell assembly (68) encased in an easy to assembly waterproof housing (16). The objective lens assembly (62), image intensifier tube (64), collimator lens assembly (66) and diopter cell assembly (68) are all supported by a common base structure (80) within the housing (16). As a result, variations caused by thermal expansions and contractions are evenly distributed among the various optical elements, thereby preserving a predetermined optical relationship between those elements. Simple button controls (28, 30, 31) are used to operate and adjust the night vision binocular assembly (10). The button controls (28, 30, 31) are disposed on a common circuit board (38). An elastomeric structure (36) is disposed between the circuit board (38) and the interior of the binocular housing (16). The circuit board (38) is affixed to the interior of the binocular housing (16) in a manner that compresses the elastomeric structure (36) against the binocular housing (16) to provide a water tight seal. The elastomeric structure (36) has switch membranes or domed portions which extend through apertures (37) in the housing (16) creating both a fluid impermeable seal with the housing (16) and a means for the tactile engagement of the switches on the below lying circuit board (38).

7 Claims, 8 Drawing Sheets

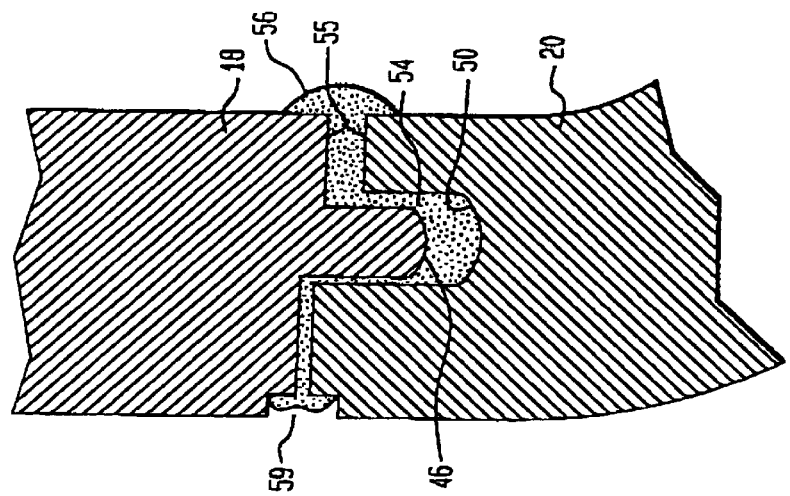
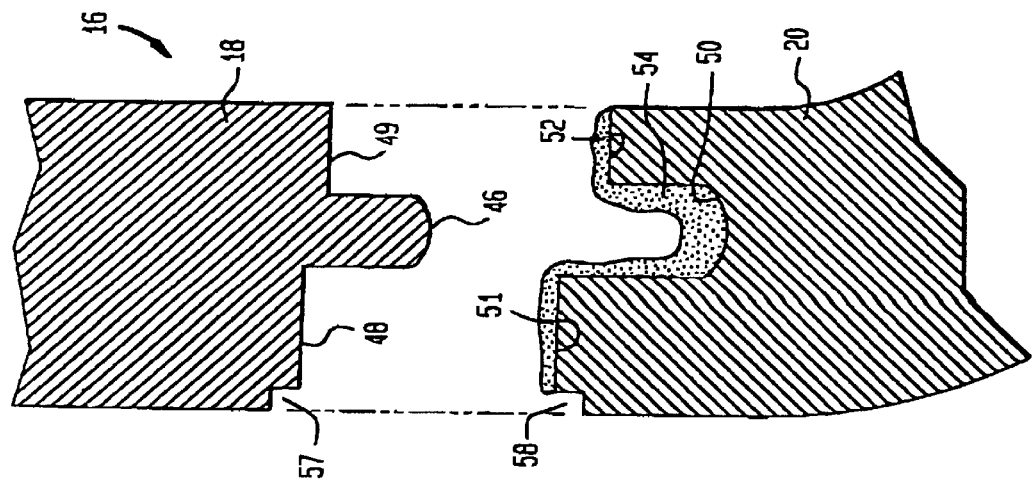

NIGHT VISION BINOCULARS

This is a Divisional of application Ser. No. 08/627,149, filed Apr. 3, 1996, now U.S. Pat. No. 5,847,868.

FIELD OF THE INVENTION

The present invention relates to optical devices that enable a viewer to observe objects at night or during other low-light conditions. More particularly, the present invention relates to a handheld binocular system that can be manufactured at low cost for sale to the general public.

BACKGROUND OF THE INVENTION

Night vision devices are widely used in the military to provide soldiers, aviators and sailors with the ability to view objects at night or during other low light conditions. As a result, many night vision devices are currently being manufactured according to exacting military specifications and designs. Similarly, many such night vision devices are being manufactured for specific military applications such as part of the sights of various weapons or as part of goggle assemblies that attach to an aviator's or soldier's helmet. As a consequence, many of the night vision devices currently being manufactured are neither affordable nor easily adapted to non-military uses by the general public.

Night vision devices typically include an image intensifier tube that converts infrared energy into visible light. Such night vision devices typically require sophisticated power supplies and circuitry to control the operation of the image intensifier tube and sophisticated optical arrangements that direct the infrared energy into the image intensifier tube and visible light away from the image intensifier tube. In military applications, the various military personnel are trained in how to use and adjust the night vision devices they are issued. However, a night vision device designed for use by the general public would have to provide simple adjustments that can be readily operated by a variety of different users in a dark environment. Furthermore, a night vision device designed for use by the general public would also require various adjustable optical characteristics that would be easy to operate and adjust. Such a consumer oriented night vision device would have wide ranging application in regard to nighttime marine piloting, nighttime security, surveillance, hunting, fishing, backpacking, navigation, underwater vision, search and rescue and law enforcement.

ITT Corporation, the assignee herein, manufactures many night vision devices for various applications. Night vision devices for military applications are exemplified by U.S. Pat. No. 5,084,780 to Phillips entitled TELESCOPIC SIGHT FOR DAY/NIGHT VIEWING and U.S. Pat. No. 5,029,963 to Naselli entitled REPLACEMENT DEVICE FOR A DRIVER'S VIEWER. ITT Corporation, also has designed handheld night vision binoculars devices. Such a binocular device is exemplified in U.S. patent application Ser. No. 07/954,006, entitled CONSUMER NIGHT VISION VIEWING APPARATUS and filed on Sep. 30, 1992. In this application, a night vision binocular device is disclosed having simplified adjustment controls, interpupillary adjustments and diopter cell focus adjustments. Related optical components that can be utilized in the construction, of night vision binocular devices are shown in U.S. patent application Ser. No. 08/039,755 now U.S. Pat. No. 5,317,397 entitled DIOPTER CELL ASSEMBLY FOR A BINOCULAR VIEWING SYSTEM, and U.S. Pat. No. 5,117,553, entitled COLLIMATOR FOR A BINOCULAR VIEWING SYSTEM, both of which are assigned to the assignee herein.

These references show a diopter cell design and a collimator lens assembly for night vision binoculars, respectively. The assignee holds many other patents and applications related to image intensifier tubes and related devices which are of interest in regard to the present subject matter.

As has been previously mentioned, an important application for publicly available night vision devices is on recreational boats. Boats often run at night utilizing only their running lights for illumination. The use of night vision devices by the pilots of boats will greatly increase visibility, resulting in less nighttime collisions and similar accidents. The night vision binoculars will enable boaters to identify objects detected on radar, see land marks, read channel markers, detect navigational hazards, identify approaching vessels and much more. The environment of a recreational boat is less than ideal for a sophisticated electro-optical device such as a handheld night vision instrument. To survive in such an environment, the night vision instrument must be capable of withstanding large temperature changes, impacts, and must be hermetically sealed to withstand the high humidity environment and the possibility of being dropped into the water. Furthermore, since most recreational boats are small, inexpensive craft, the night vision device must provide the same performance as military specification night vision devices but at a greatly reduced cost so as to be affordable to the average boater.

It is therefore the object of the present invention to provide a night vision device that is easy to hold, easy to operate, water proof and provides the same performance as military night vision devices at a greatly reduced cost.

It is a further object of the present invention to provide component parts for the above-mentioned night vision device that are easy to manufacture and assemble, thereby further reducing the cost of manufacturing the night vision device.

SUMMARY OF THE INVENTION

The present invention is a night vision binocular assembly capable of converting low intensity light and infrared energy into a visible image. The night vision binocular assembly includes at least one objective lens assembly, image intensifier tube, collimator lens assembly and diopter cell assembly encased in an easy to assemble waterproof housing The objective lens assembly, image intensifier tube, collimator lens assembly and diopter cell assembly are all supported by a common optical base or bed structure within the housing. As a result, variations caused by thermal expansions and contractions are evenly distributed among the various optical elements, thereby preserving a predetermined optical relationship between those elements.

Simple button controls are used to operate and adjust the night vision binocular assembly. The button controls include an on/off switch, a brightness switch and a focus switch, all of which being surface mounting switching elements that are disposed on a common circuit board within the binocular housing. An elastomeric planar sheet having domed sloped integral switching actuating projections is disposed between the circuit board and the interior of the binocular housing. The circuit board is affixed to the interior of the binocular housing in a manner that engages the elastomeric structure. The elastomeric structure is glued by means of a waterproof epoxy or adhesive to the internal surface of the housing and is held and maintained in position by a plurality of pegs extending on looping extensions which align the elastomeric switch sheet with the circuit board. The domed projections of elastomeric structure extend through apertures in the binocular housing creating both a fluid impermeable seal with the housing and with the domed projections providing a means for the tactile engagement of the switching elements on the circuit board.

The present invention night vision binocular assembly is manufactured in a manner that promotes both ease of use and ease of assembly. The primary optical elements of the night vision binoculars all interconnect onto the common optical base or bed structure with a minimal number of mechanical fasteners. The diopter cell assemblies require no mechanical fasteners in their assembly and the binocular housing can be assembled to be water tight without the use of a gasket. As a result, the present invention night vision binoculars can be manufactured and assembled in a highly reliable and cost efficient manner, thereby making the night vision binoculars affordable to the general consuming public.

BRIEF DESCRIPTION OF THE FIGURES

For a better understanding of the present invention, reference may be had to the following description of an exemplary embodiment thereof considered in conjunction with the accompanying drawings in which:

FIG. 3a is a cross-sectional view of a section of the housing of the present invention binocular assembly, shown prior to assembly;

FIG. 3b a cross-sectional view of a section of the housing of the present invention binocular assembly, shown after assembly;

DETAILED DESCRIPTION OF THE INVENTION

Figure 1:
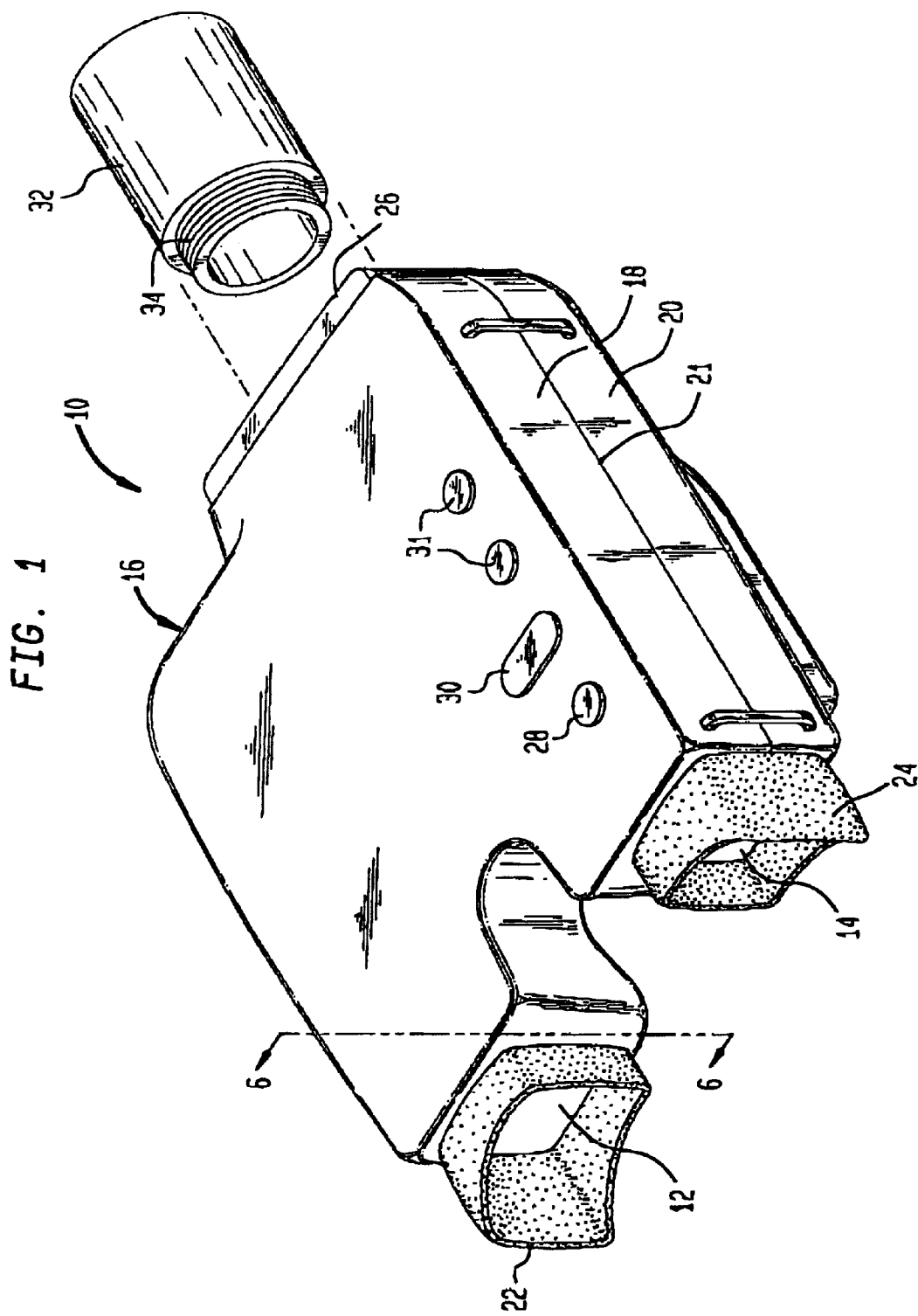
FIG. 1 is a front perspective view of one preferred embodiment of the present invention night vision binocular assembly.

Referring to FIG. 1, there is shown one preferred embodiment of the present invention night vision binoculars 10. As will be explained, the night vision binoculars 10 have a single objective lens for receiving infrared and low intensity light and two eye piece assemblies 12, 14 for viewing a visible image created from the received light. As will be later explained, the objective lens and the two eyepiece or ocular assemblies 12, 14 are adjustable to the physical and optical needs of the viewer that is utilizing the night vision binoculars 10.

The optics and electronics of the night vision binoculars 10 are encased in a waterproof housing 16. The housing 16 itself includes a upper half or section 18 and a lower half or section 20 that are joined together to create a fluid impermeable seal 21 along a line defined by the peripheral edges of sections 18 and 20 when the sections are coupled together. The housing 16 is preferably made of a material that is highly impact resistant, corrosion resistant and is light weight. In a preferred embodiment, the housing 16 is made of a thermoplastic material such as XENOY® PC/PBT resin alloy. However similar thermoplastic materials such as the XENOY® 2000 & 5000 Series thermoplastic alloys can also be used. These generally are polyester bond urethanes. These thermoplastics are supplied by the General Electric Company via the GE Plastics Division. Such materials are light weight and provide the needed corrosion resistance and impact resistance. Furthermore, such materials can be manufactured in a variety of bright colors. It is desirable to produce the night vision binoculars 10 with a brightly colored housing to facilitate the location of the binoculars should they be misplaced or accidentally dropped into a body of water such as a lake or the ocean. The water tight housing 16 of the night vision binoculars 10 is sized to make the night vision binoculars 10 buoyant. Furthermore, the components of the night vision binoculars 10 are so distributed within the housing 16 so that the night vision binoculars 10 will float in the upright position shown in FIG. 1 or in the upside down position. This exposes the maximum surface area of housing 16 which floats above the water and thereby making the binoculars 10 more easy to spot in the water.

Since the water tight housing 16 is preferably a thermoplastic material, the housing 16 is relatively rigid. To enhance the impact resistance of the night vision binoculars 10, elastomeric material in the form of eyeshades 22, 24 are placed around each of the eyepiece assemblies 12, 14. Similarly, a elastomeric bumper 26 is disposed around the objective lens of the night vision binoculars 10. The elastomeric material at these positions helps absorb the energy of an impact should the binoculars 10 be dropped. By placing the elastomeric material around the region of the eyepiece assemblies 12, 14 and the objective lens, it is less likelt that the force of impact will be transferred to these optical elements with enough energy to damage these elements. Furthermore, the elastomeric eyeshades 22,24 surrounding each of the eyepiece assemblies 12, 14 shade a persons eyes from secondary light and provide comfort when viewing through the night vision binoculars 10.

Some of the electronic components contained within the night vision binoculars 10 are controlled by actuatible elastomeric switch projections employed as actual buttons that extend through associated apertures in the upper half 18 of the housing 16. The control buttons include an on/off button 28 for controlling the activation and deactivation of the binoculars 10, a focus button 30 for controlling the focus conjugate of the objective lens and a set of two brightness buttons 31 for controlling the brightness of the viewed image.

As will be later explained, the night vision binoculars 10 are manufactured with one set power of magnification. The night vision binoculars 10 may also be joined with a supplemental magnification lens 32 to increase the power of magnification. For instance, the night vision binoculars 10 may come with an initial power of magnification of 3× however when the supplemental magnification lens 32 is added, the power of magnification may be increased to 8×. The supplemental magnification lens 32 shown has a threaded end 34 that engages the night vision binoculars 10. Such interconnections systems are well known for joining telephoto lenses to cameras and any such known interconnection system may be employed. Similarly, interference fit connections or other such mechanical interconnection systems may also be employed.

Figure 2:
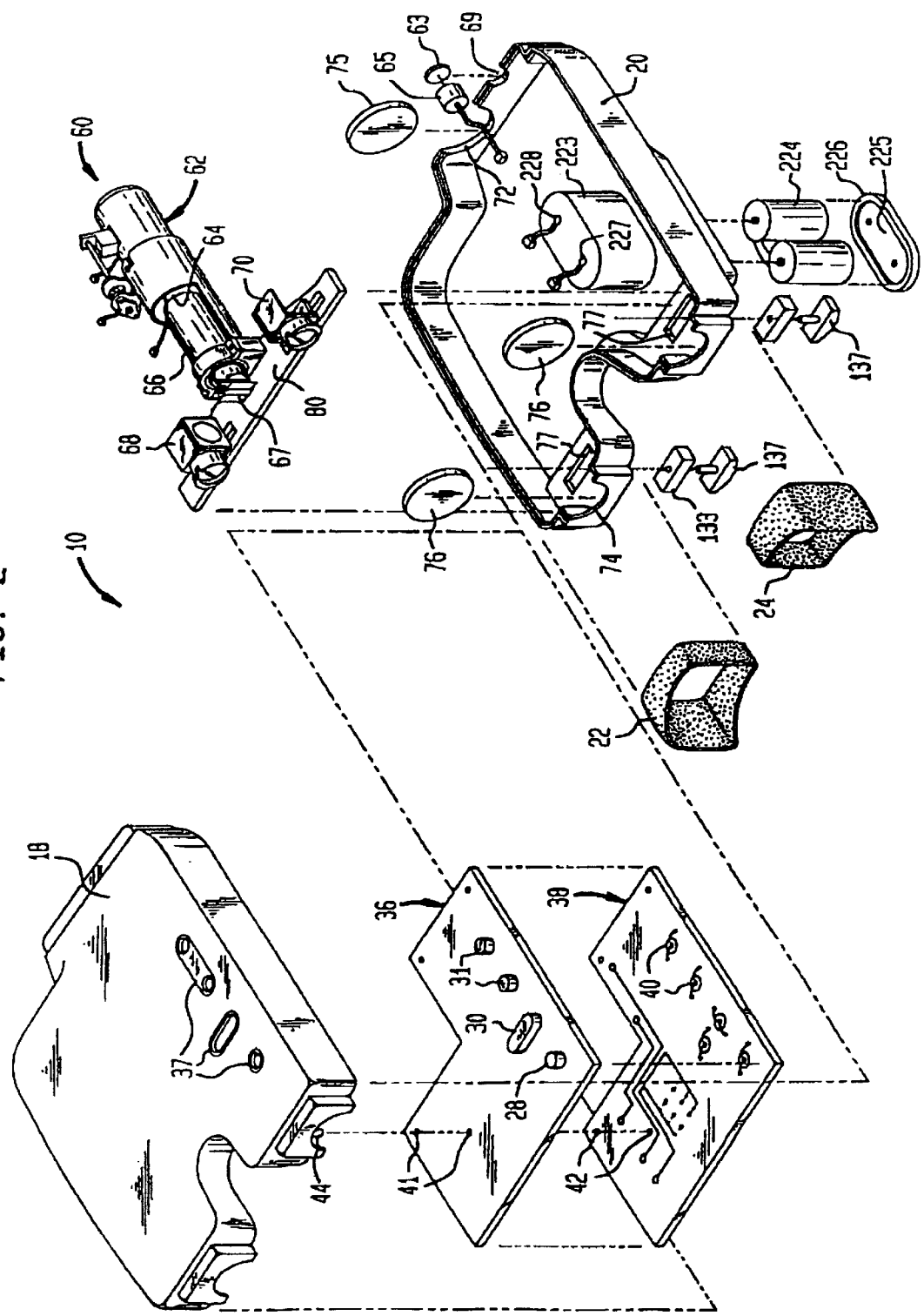
FIG.2 is an exploded view of the embodiment shown in FIG. 1 to facilitate consideration ad discussion.

Referring to FIG. 2 in conjunction with FIG. 1, it can be seen that domed projections creating the on/off switch 28, focus button 30 and brightness control buttons 31 are all unistructurally formed from single molded piece of elastomeric material. The elastomeric structure 36 is water impermeable and the various domed projections are formed in the elastomeric structure 36 so that they pass through associated button aperatures 37 in the upper half 18 of the housing 16. Some identifying indicia may be molded onto the buttons to help a person easily identify the function of the button. A circuit board 38 is disposed against the elastomeric structure 36 within the housing 16. Membrane switches, such as keyboard type switches 40, or other pressure sensitive switches are disposed on the circuit board 38 directly below the on/off button 28, focus button 30 and brightness control buttons 31. As a result, as the on/off switch 28, focus button 30 or brightness control buttons 31 are depressed, the membrane of the switch is actuated thus closing or opening the switch. These switches are bipolar as normally open or normally closed and when activated operate in the opposite state (ON or OFF) thus a corresponding signal is generated within the circuitry of the circuit board 38 by the below lying pressure switch 40.

Connecting apertures 41, 42 are disposed in the elastomeric structure 36 and the circuit board 38, respectively. In one embodiment, locking pegs or extensions 44 extend downwardly from the upper half 18 of the housing 16. The elastomeric sheet or structure 36 with the extending elastomeric domed buttons 28, 30 and 31 is placed over the plurality of pegs or locking extensions 44 via the apertures 41, so that it is precisely located due to the plurality of spaced pegs and apertures. The elastomeric structure 36 is glued securely in place to the housing by means of a waterproof adhesive such as methyl acrylate or a similar viscous waterproof epoxy. As a result, the elastomeric structure 36 is joined to the housing section 18 and provides a water tight seal. The locking extensions 44 pass through the connecting apertures 41, 42 in the elastomeric structure 36 and the circuit board 38, wherein the locking extensions 44 are heat sealed or otherwise formed to secure and locate the circuit board 38 proper position with respect to the elastomeric structure. As a result, the elastomeric structure 36 is retained between the circuit board 38 and the upper half 18 of the housing 10 assisting in the invention of a water impermeable seal with the housing 16. The resultant compression of the elastomeric structure 36 helps the elastomeric structure 36 to further act as a gasket and create a seal around each of the button apertures 37. Consequently, should the night vision binoculars 10 be submerged in water, the water cannot enter the housing 16 through the button apertures 37 in the housing 16. It will be understood that the use of a plurality of locking extensions 44 is merely exemplary and the circuit board 38 uses may be joined to the housing 16 using other schemes. In any event, the above techniques is extremely effective and inexpensive as the elastomeric structure when glued in position and located by the locking extensions automatically is aligned with the membrane switches 40 on the board 38 and forms a waterproof cover and seal for both the board and the housing.

As can be seen from FIG. 2 the upper half 18 and the lower half 20 of the binocular housing 16 join together along a complex peripheral path which path is defined by the peripheral edge of the corresponding openings of the upper and lower housing halves 18 and 20. However, it is necessary to join the upper half 18 and the lower half 20 of the housing 16 together to create a fluid impermeable seal along the common joint 21 (FIG. 1). Such a seal may be accomplished through the use of a suitably shaped gasket placed between upper half 18 and the lower half 20 of the housing 16. However, due to the complex shape of the peripheral edges, a gasket that would operate to join and seal the edges would be expensive to manufacture and highly labor intensive to install. Thus, in order to avoid the use of a gasket the peripheral edge of the upper housing section 18 is formed with a depending peripheral projection (46 of FIG. 3A) while the corresponding edge of the lower housing section 20 is provided with a corresponding peripheral groove (50 of FIG. 3A). The projection and groove are specially shaped to enable an inner seal formation as will be further explained when referring to FIGS. 3A and 3B. In this manner, when the top housing section 18 is placed in congruency with the bottom housing section 20 the projection engages the groove to enable insertion of the top half housing section 18 into the lower half. As will be explained, both the projection 46 and groove 50 are specially shaped to contain a suitable adhesive enabling an inner peripheral housing seal to be formed to thus provide a waterproof seal for the housing 10 between the upper and lower halves without the need for a gasket. Referring to FIG. 3a, there is shown a section of the upper half 18 of the housing 16 just prior to its being inserted into the corresponding groove of the bottom half 20 of the housing 16. The upper section 18 of the housing 16 has a projection 46 extending downwardly therefrom. The bottom surfaces 48, 49 on either side of the projection 46 lay in two different planes with the bottom surface 48 proximate the exterior of the housing being higher than the bottom surface 49 proximate the interior of the housing. The lower section 20 of the housing 16 has a shaped groove or receptacle 50 formed along the edge that faces the upper section 18 of the housing 16. The top surfaces 51, 52 on either side of the receptacle 50 also lay in two different planes with the top surface 51 proximate the exterior of the housing being higher than the top surface 52 proximate the interior of the housing. For a purpose which will later be explained, the receptacle 50 on the lower section 20 of the housing 16 is sized to be significantly larger than the projection 46 extending from the upper section 18 of the housing 16.

Prior to the upper section 18 of the housing 16 being joined to the lower section 20, an adhesive 54 is applied within the groove 50 of the lower section 20. The adhesive 54 is material that bonds to the thermoplastic material of the housing 16 and cures to become water impermeable. A suitable and preferable adhesive contains methyl acrylate as a component which can be applied and employed similar to an epoxy using an activator which is mixed with the adhesive material. Such materials are available from ITW adhesive systems, of 30 Endicatt Street, Danvers, Mass. 01923. There are other adhesives which will operate as well. The adhesive has to be relatively viscous and hence not pour but act as an epoxy as being thick so it can be extruded to form the seal. Referring to FIG. 3b, it can be seen that as the upper section 18 of the housing 16 is joined to the lower section 20, a larger gap 55 is created proximate the interior of the housing than is created proximate the exterior of housing. As a result, the adhesive 54 present between the upper section 18 and the lower section 20 is directed toward the inside of the housing structure. Excess adhesive that is extruded from the joint creates a bead 56 on the inside of the housing. The bead 56, created by the surface tension of the adhesive 54, covers the entire joint along the inside of the housing 16. Notches 57, 58 are disposed on the upper section 18 and the lower section 20 of the housing 16 at points proximate the exterior of the housing 16. As the upper and lower sections 18, 20 arc joined, a semi-rectangular relief 59 is formed on the exterior of the housing 16 that runs along the joint between the upper and lower sections 18, 20. Excess adhesive 54 that is extruded from the joint fills the back of the semi-rectangular relief 59 thereby providing a clean assembly without a highly visible line of adhesive. The presence of the adhesive 54 between the upper and lower section 18, 20, in the semi-rectangular relief 59 and along the bead 56 inside the housing 16, creates a barrier that hermetically seals the interior of the housing 16. Once the adhesive 54 cures, a fluid impermeable seal is created between the upper and lower sections 18, 20 of the housing 16 without the use of a gasket. As a result, the upper and lower sections 18, 20 of the housing 16 can be joined in a cost effective and labor efficient manner.

Returning to FIG. 2 primary electrooptical subassembly 60 is shown and to be positioned within the internal hollow of the housing below the circuit board 38. The electrooptical subassembly 60 includes an objective lens assembly 62 for receiving and focusing infrared energy, an image intensifier rube 64 for converting the infrared energy from the objective lens 62 into a visible image, a collimator lens assembly 66 for collimating the visible image, a beam splitter 67 for dividing the collimated image and two diopter or ocular cell assemblies 68, 70 through which the divided image is viewed with binocular vision. Each housing half section 18 and 20 have partial apertures which form full window apertures as 74 and 72 when the housings sections or halves are secured or joined together. Accordingly, window apertures 72, 74 are formed in the housing 16. The aperture 72 aligns with the objective lens assembly 62 allowing infrared energy to pass into the housing 16 and impinge upon the objective lens assembly 62. A protective window 75 is positioned within the aperture 72 through which the infrared energy passes. The window 75 is secured to the housing 16 with a fluid impermeable seal or adhesive thereby preventing the flow of water into the housing 16 through the aperture 72. In a similar arrangement, two viewing apertures 74 align with the diopter cell assemblies 68, 70 to provide the ocular viewing paths. Protective windows 76 are positioned within the view apertures 74. The protective windows 76 are joined to the housing 16 with a fluid impermeable seal, (using the above described adhesive), thereby isolating the environment contained within the housing 16. A light sensor 65 is disposed within the housing 16. The light sensor 65 senses light through an aperture 69 in the housing 16. The complete aperture 69 is formed when housing sections 18 and 20 are joined together. The aperture 69 is aligned along an axis parallel to the longitudinal axis or optical axis of the objective lens assembly 62 As such, the light sensor 65 operates detect the intensity of radiant energy that is impinging upon the objective lens assembly 62. This enables one to operate circuitry to block or deactivate the image intensifier tube 64 for excessive light levels which could damage the screen of the tube. See for example, U.S. Pat. No. 5,146,077 entitled "GATED VOLTAGE APPARATUS FOR HIGH LIGHT RESOLUTION AND BRIGHT SOURCE PROTECTION OF IMAGE INTENSIFIER TUBE by Casert et al, issued on Sep. 8, 1992 and assigned to the assignee herein. That patent describes protection circuits as well as describing GEN II and GEN III image intensifiers. A protective window 63 covers the aperture 69 in a fluid impermeable manner, thereby protecting the light sensor 65 and the interior of the housing 16 from moisture and other contaminants.

Figure 4:
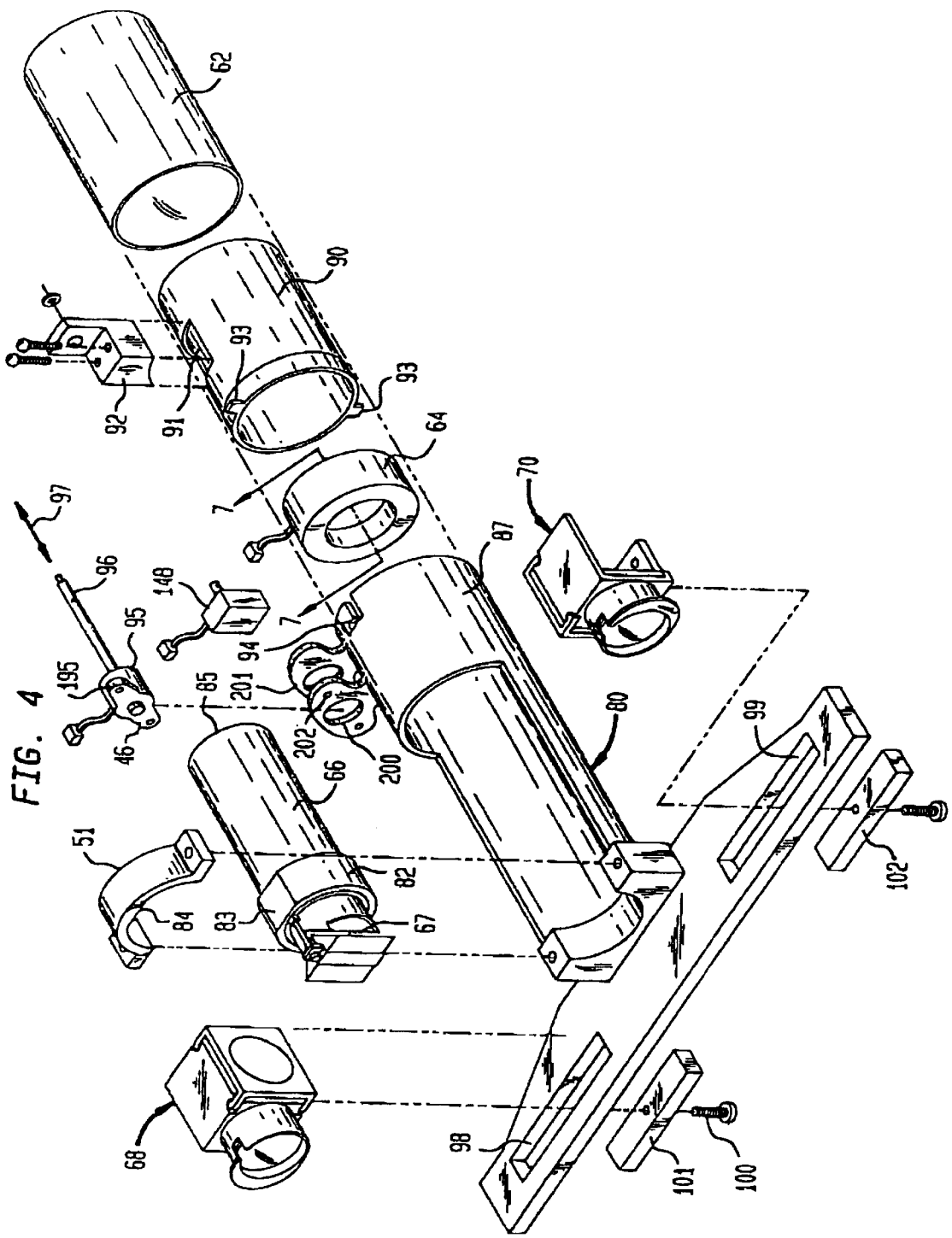
FIG. 4 is an exploded view of the electro-optical subassembly contained within the present invention binocular assembly.

Referring to FIG. 4 in conjunction with FIG. 2 it can be seen that the objective lens assembly 62, image intensifier tube 64, collimator lens assembly 66 and diopter cell assemblies 68, 70 all are supported by a common optical base or support structure 80. The common optical base 80 is "T" shaped having the top arm of the "T" of a planar configuration with a right and left slots 98 and 99 positioned on either side of the central arm of the "T". The central arm is of a semi-cylindrical shape extending from the top arm and for accommodating the objective lens, the image intensifier and so on. Because of the common base configurations thermal expansion or contraction caused by a change in temperature will cause the objective lens assembly 62, image intensifier tube 64, collimator lens assembly 66 and diopter cell assemblies 68, 70 to be integrally effected thus maintaining the exact alignment for all such changes. As a result, the distances between the optical components remains generally constant, eliminating distortions that could be caused by uneven thermal expansions and contractions. In the preferred embodiment the casings surrounding the lenses in the objective lens assembly 62, collimator lens assembly 66 and diopter cell assemblies 68, 70 have the same general coefficient of thermal expansion as does the base structure 80 so as to promote a uniform response to any change in temperature and maintain the preset relationships between the various optical components. A suitable material for the common optical bed or base 80 is a poly carbonate plastic.

In the shown embodiment, the beam splitter 67 is coupled to the collimator lens assembly 66 and is attached to the optical base structure 80 by a semicircular clamp 81. The casing 82 of the collimator lens assembly 66 has a flat region 83. Similarly, the semicircular clamp 81 also has a flat region 84. Consequently, as the collimator lens assembly 66 is connected to the base structure 80 by the semicircular clamp 81, the two flat regions 83, 84 align and the collimator lens assembly 66 with beam splitter 67 are automatically held in a predetermined set orientation. As such, by simply clamping the collimator lens assembly 66 to the base structure 80, the collimator lens assembly 66 and beam splitter 67 are properly optically aligned with the other optical elements within the binocular housing. Collimator lens assemblies for night vision binoculars are known devices as is exemplified by U.S. Pat. No. 5,117,553 to Phillips entitled COLLIMATOR FOR A BINOCULAR VIEWING SYSTEM and assigned to ITT Corporation the assignee herein. This patent is incorporated herein by reference. The operation of collimator lens assemblies are well known.

An image intensifier tube 64 interconnects with the distal end 85 of the collimator lens assembly 66. Although the image intensifier tube 64 can be of any type, in the preferred embodiment, the image intensifier tube is similar to a Generation II (GEN II) tube of a type manufactured by ITT Corporation, the assignee herein. In the shown embodiment, the image intensifier tube 64 has an elastomeric casing (86 of FIG. 7). The base structure 80 includes an enclosed tubular region 87 that has a diameter slightly smaller than the elastomeric casing 86 of the image intensifier tube 64. The elastomeric casing 86 of the image intensifier tube 64 passes into the enclosed tubular region 87 where it is retained by an interference fit. The lateral movement of the image intensifier tube 64 back and forth within the enclosed tubular region 87 is prevented by the interference fit and the abutment of the image intensifier tube 64 against the collimator lens assembly 66 and the sleeve 90 surrounding the objective lens assembly 62.

The objective lens assembly 62 is surrounded by a circular sleeve 90 in such a manner so that the objective lens assembly 62 is free to move axially or reciprocate along the longitudinal axis of the tubular sleeve 90. An aperture 91 is formed in the peripheral wall of the tubular sleeve 90. A stop block 92 is connected to the objective lens assembly 62 and extends radially away from objective lens assembly 62 through the aperture 91. As such, the stop block 92 contacts the edges of the aperture 91 as the objective lens assembly 62 moves back and forth. As a result, the stop block 92 limits the axial movement of the objective lens assembly 62 along the longitudinal axis of the tubular sleeve 90.

Locking projections 93 extend radially from the tubular sleeve 90. The locking projections 93 engage locking slots 94 formed in the tubular region 87 of the base structure 80. By passing the projections 93 into the locking slots 94 and turning the tubular sleeve 90 relative the base structure 80, the tubular sleeve 90 is locked into a desired set position on the base structure 80.

A stepper motor 95 is connected to the base structure 80. The stepper motor 95 has extending flanges 195 and 196 which enable the body of the motor to be inserted into the aperatures 200 of motor bracket 201 formed integrally or otherwise located on the common optical bed 80. The flanges 195 and 196 of the motor 95 are secured to the bracket 201 via apertures 202. The shaft 96 of the motor as indicated is coupled to the stop block 92 to thus move the objective lens 62 according to the motor operation. The stepper motor shaft 96 interconnects with the stop block 92 extending from the objective lens assembly 62 As will later be explained, the stepper motor 95 can be activated to move its shaft 96 back and forth in the directions of arrow 97 utilizing incremental steps. This movement moves the objective lens assembly 62 within the tubular sleeve 90, which therefore moves the lens 62 in relation to the image intensifier tube 64. Small stepper motors capable of moving in small increments such as 0.0005 inches to 0.004 inches per step are commercially available such as those manufactured by Haydon Switch Instruments, Inc. of Connecticut and sold under the designation HSI miniature motors.

A position sensor such as a micro switch or pressure optical switch 148 is attached to the optical base structure 80 proximate to the stepper motor 95. The position sensor 148 is contacted by the stop block 92 as the stepper motor 95 moves the stop block 92 back and forth. The distance between the position sensor 148 and the stop block 92 is set so that the position sensor 148 is triggered when the stop block 92 moves the objective lens assembly 62 to a position relative the image intensifier tube 64 to image the incoming energy at an infinite conjugate.

As indicated, slots 98, 99 are formed in the upper arm of the "T" sloped base structure 80. A mechanical fastener 100 or other similar element joins each of the diopter call assemblies 68, 70, to slide blocks 101, 102 through the slots 98, 99. As a result, each of the diopter cell assemblies 68, 70 is joined to the base structure 80, yet sill can move along the length of each of the slots 98, 99. The purpose of each of the diopter cells 68, 70 is to redirect light emanating from the collimator lens assembly 66 and split by the beam splitter 67 into the viewer's eyes.

Figure 5:
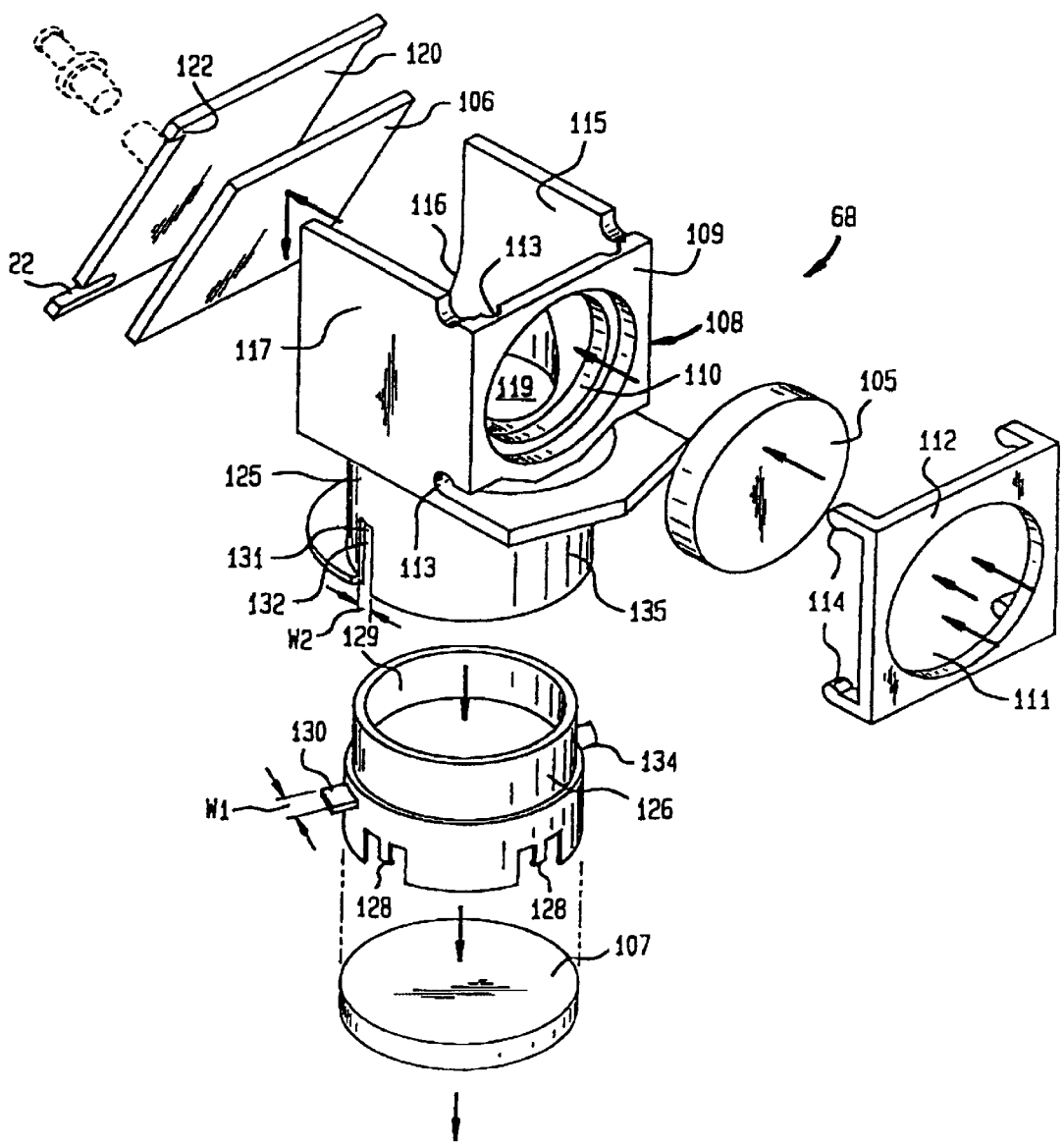
FIG. 5 is an exploded view of a diopter cell subassembly contained within the present invention binocular assembly.

Referring to FIG. 5, it can be seen that each of diopter cell assemblies is a snap-together assembly requiring no adhesives or mechanical fasteners. FIG. 5 shows one of the diopter cell assemblies 68 as used in the present invention night vision binoculars. Each cell is identical. Light (designated by the arrows) entering the diopter cell assembly 68 passes through a first lens 105, where it is reflected 45° by a mirror 106 and redirected through an ocular lens 107. The first lens 105 and the mirror 106 are both connected to a common cell housing 108. The cell housing 108 has a face surface 109 through which an aperture 110 is formed. The aperture 110 has a stepped rim sized to accommodate the first lens 105. As a result, the first lens 105 can pass into, and become seated within, the aperture 110. A snap-on cover 112 connects to the cell housing 108 over the first lens 105. The cover 112 has an aperture 111 formed through it that is smaller than the diameter of the first lens 105. Consequently, when the cover 112 is joined to the cell housing 108, the fast lens 105 becomes entrapped in a set position between the cover 112 and the cell housing 108. The aperture 111 in the cover 112 is positioned to enable light to pass into the first lens 105 and into the cell housing 108. Pawl receptacles 113 are formed on the cell housing 108 at points proximate the face surface 109. The cover 112 has locking pawls 114 that extend into and engage the pawl receptacles 113 on the cell housing 108, thereby interconnecting each of the two components with a snap fit.

Within the cell housing 108 a 45° sloped surface 116 extends between two side walls 117, 118. An aperture 119 is disposed in the sloped surface 116 at a position that aligns with the aperture 110 in the face surface 109 of the cell housing 108. The mirror 106 lays across the sloped surface 116 covering the aperture 119 in the sloped surface 116. The mirror 106 is held in one set position over the sloped surface 116 by a black plate 120. Projecting arms 122 extend from the four corners of the backplate 120. These projecting arms 122 engage notches 124 formed in the side walls 117, 118 as the back plate 120 passes between sidewalls 117, 118. The position of the notches 124 and the size of the back plate 120 correspond so that the back plate 120 engages the notches 124 with a slight interference fit, thereby enabling the projecting arms 122 to snap fit into the notches 124 and retain the backplate 120 in one set position. The backplate 120 biases the mirror 106 against the sloped surface 116, thereby retaining the mirror 106 over the aperture 119 in the sloped surface 116.

Figure 6:
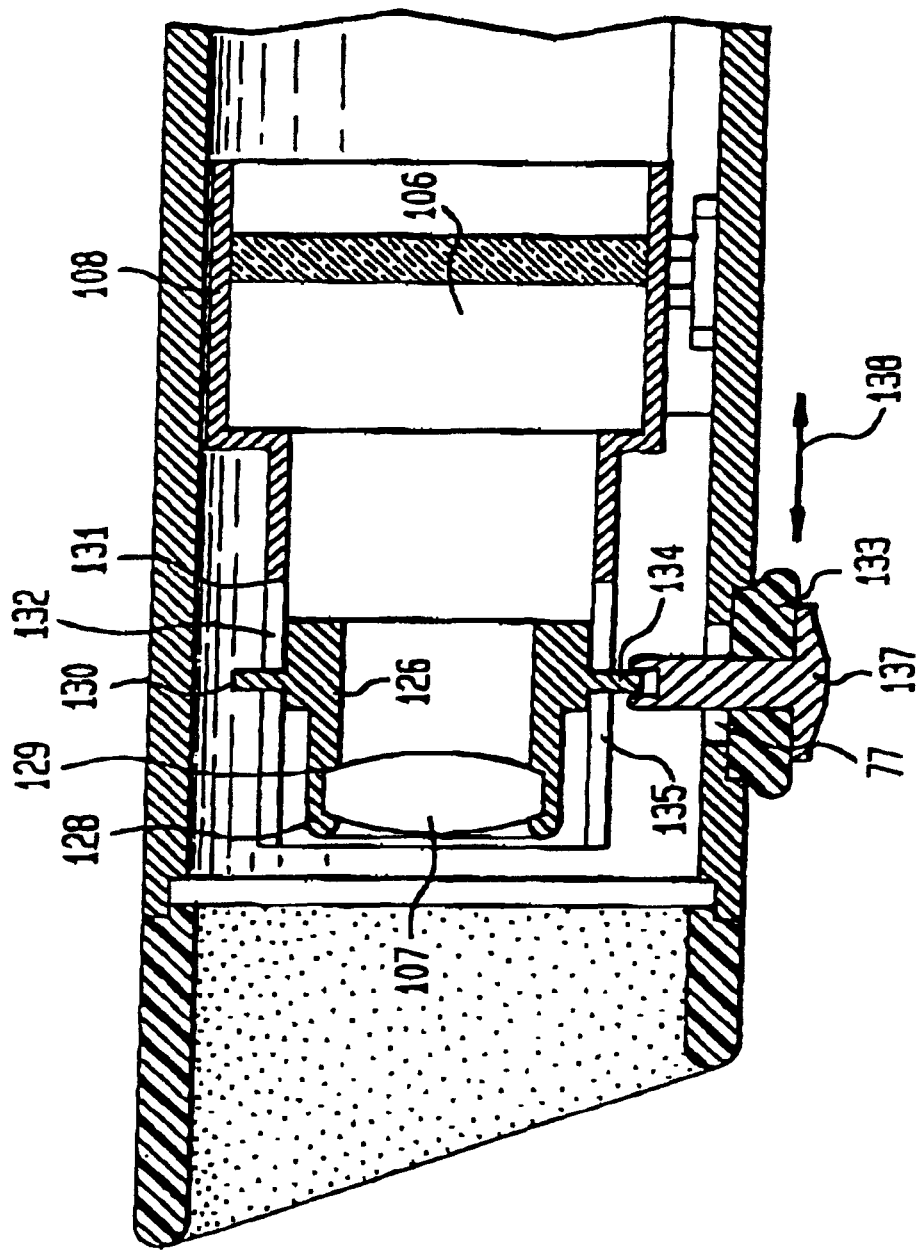
FIG. 6 is a cross-sectional view of the region of the present invention binocular assembly containing the diopter cell subassembly, viewed along section line 6—6 as expressed in FIG. 1.

The mirror 106 directs light passing through the first lens 105 into the tubular region 125 of the cell housing 108. The tubular region 125 of the cell housing 108 is sized to receive a sliding collar 126 therein. Referring to FIG. 6 in conjunction with FIG. 5, it can be seen that the sliding collar 126 is a tubular structure that has locking fingers 128 proximate its distal end The ocular lens 107 is inserted into the sliding collar 126 wherein the locking fingers 128 engage the lens 107 and forces the lens against an internal rim structure 129. As a result, the locking fingers 128 retain the lens 107 into a set position within the sliding collar 126. A key projection 130 extends radially from the exterior surface of the sliding collar 126. The key projection 130 has width W1 (FIG. 5) that is slightly smaller than the width W2 of a corresponding slot 132 in the cell housing 108. The sliding collar 126 fits within the tubular region 125 of the cell housing 108 wherein the key projection 130 enters the slot 132. The sliding collar 126 is free to move back and forth within the cell housing 105 provided the key projection 130 does not contact the back edge 131 of the slot 132. The presence of the key projection 130 in the slot 132 prevents the sliding collar 126 from rotating within the cell housing 108; to thus retain the viewing lens 107 in its proper orientation as it is moved back and forth with the sliding collar 126.

An adjustment shaft 134 also extends radially from the exterior of the sliding collar 126. The adjustment shaft 134 passes into a second slot 135 in the cell housing 108 as the sliding collar 126 is positioned within the cell housing 108. As the overall diopter cell 68 is assembled within the night vision binoculars, the adjustment shaft from each of the two diopter cells aligns with slots 77, formed in the bottom of the lower half of the housing as is shown in FIG. 2. Adjustment knobs 137 extend through each of the slots 77 in the housing and engage the adjustment shafts 134. As can be ascertained from FIG. 6, the adjustment knobs 137 can be moved back and forth in the directions of arrow 138 and also back and forth into and out of the plane of the paper. As the adjustment knobs 137 are moved back and forth in the directions of arrow 138, the sliding collar 126 is caused to move back and forth within the cell housing in the same direction. This changes the position of the ocular lens 107 with respect to the other optical elements in the binoculars. Consequently, the movement of the ocular lenses 107 acts as a focus adjustment, whereby the binoculars can be individually adjusted for each eye. As the adjustment knobs 137 are moved back and forth into and out of the plane of the paper, each of the diopter cell assemblies are caused to move with the adjustment knobs 137. Such a manipulation various the distance in between the diopter cell assemblies thereby providing an interpupillary adjustment to the night vision binoculars. The movement of the adjustment knobs 137 causes the diopter cell assemblies to move back and forth in the slots 98, 99, shown in FIG. 4. As a result, the distance between each of the diopter cell assemblies and the beam splitter can be varied indvidually and the diopter cell assemblies can be individually adjusted as desired. This type of operation interpupillary adjustment and focus is described in the copending application Ser. No. 07/954,006 indicated above. Elastomeric grommets 133 seal the slots 77 around each of the adjustment knobs 137, thereby creating a fluid impermeable seal that prevents water and other contaminants from entering the binocular housing. The grommets are secured to the housing by adhesive seals.

Referring now solely to FIG. 2, the optical operation of the night vision Binoculars 10 can be described. To activate the night vision binoculars 10, the on/off button 28 is depressed. Upon activation, the stepper motor 95 is enabled whereby the stepper motor 95 focuses the objective lens assembly 62 at a generally infinite conjugate. The focus of the objective lens assembly 62 can be changed by the manipulation of the focus button 30. By depressing either side of the focus button 30, the stepper motor 95 can be controlled in a manner that provides a variable adjustment to the objective lens assembly 62 between an infinite conjugate and a conjugate of one meter. For example, by depressing the elastomeric switch activator or button on the left side, the stepper motor rotate the shaft 96 counter clock wise (CCW) to cause the motor shaft 96 to move forward and by depressing the elastomeric switch activator the right side the motor move clock wise (CW) to cause the motor shaft to move in the appropriate direction of vice versa.

Infrared or low intensity visible light is directed through the objective lens assembly 62 onto the image intensifier tube 64. The image intensifier tube 64 produces a visible image which is then directed to the collimator lens assembly 66. The brightness of the image produced by the image intensifier tube 64 is controlled by the manipulation of the brightness buttons 31. By depressing one of the brightness buttons 31, the gain of the image intensifier tube 64 can be increased or decreased, thereby increasing or decreasing the brightness of the image produced. Brightness controls for image intensifiers are well known. Since the image intensifier tube 69 is highly sensitive to light, a light sensor 65 is also made part of the night vision binoculars assembly. The light sensor 65 is coupled to a control circuit on the circuit board 38 that compares the detected light level to a threshold level and automatically turns off the image intensifier tube 64 should the threshold light level be surpassed.

The image produced by image intensifier tube 64 is directed through the collimator lens assembly 66 that reimages the image at a generally infinite conjugate. The conjugated image is then split in two by the beam splitter 67 and directed toward the two diopter cell assemblies 68, 70. The split image passes through each of the diopter cell assemblies where it is viewed with binocular vision and focused to the requirements of the user. The focusing and interpupillary positioning of each of the diopter cell assemblies 68, 70 is controlled by the adjustment knobs 137 as has been previously explained.

Figure 7:
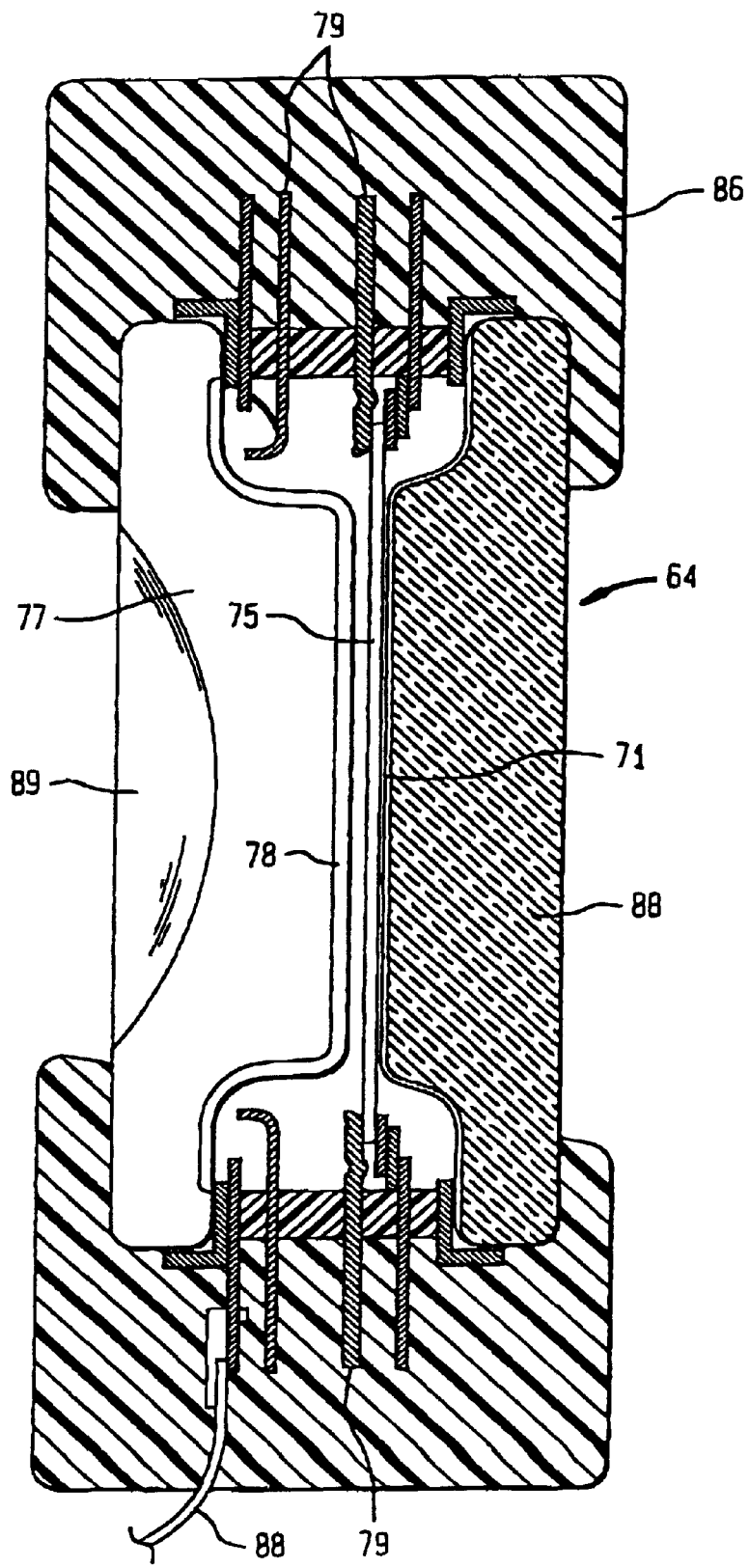
FIG. 7 cross-sectional view of the image intensifier tube contained within the present invention binocular assembly, viewed along section line 7—7 as expressed in FIG. 4.

Referring to FIG. 7, a cross section of one preferred embodiment of the image intensifier tube 64 and its elastomeric casing 86 are shown Although the image intensifier tube 64 can be of any known design, it is preferably a GEN II image intensifier tube. The operation of the GEN II image intensifier tube is known in the art. In the shown embodiment, the image intensifier tube 64 is a type of GEN II tube that has been modified to be produced at a much lower cost than typical GEN 11 tubes for military applications. The image intensifier tube 64 has a photocathode 71, microchannel plate 73, and a optical window 77 coated with a phosphor screen 78. To operate the image intensifier tube 64 various known electrical biases are applied to the photocathode 71, microchannel plate 73 and phosphor screen 78 to promote the flow of electrons from the photocathode 71 to the phosphor screen 78. In the prior art, electrical potentials were supplied to these components utilizing connector pins that extended into the evacuated housing of the image intensifier tube. Typically, the connector pins were disposed as far away form one another as possible to prevent any arcing from occuring between the various connector pins. In the shown embodiment, electrical bias is supplied to the photocathode 71, microchannel plate 73, and phosphor screen 78 via conductive annular flanges 79 that radially extend from the image intensifier tube 64. Wires 88 are then joined to the annular flanges 79 at the most convenient point and need not be directed to a single connector pin.

The elastomeric casing 86 that surrounds the image intensifier tube 64 is molded around the image intensifier tube 64. As such, the elastomeric material of the casing 86 fills the spaces between the various annular flanges 79. The elastomeric casing 86 therefore acts to encapsulate each of the annular flanges 79 and electrically isolates the annular flanges 79 from one another. The elastomeric casing 86 further acts to encapsulate the interconnection point between the various annular flanges 79 and wires 88, thereby deterring the wires 88 from detaching from the annular flange 79. The glass input and output plates as 78 and 77 are the same exact configuration with the exception of the domed portion 89. The annular connecting rings and the plate shape enable a inexpensive tube to be provided.

Figure 8:
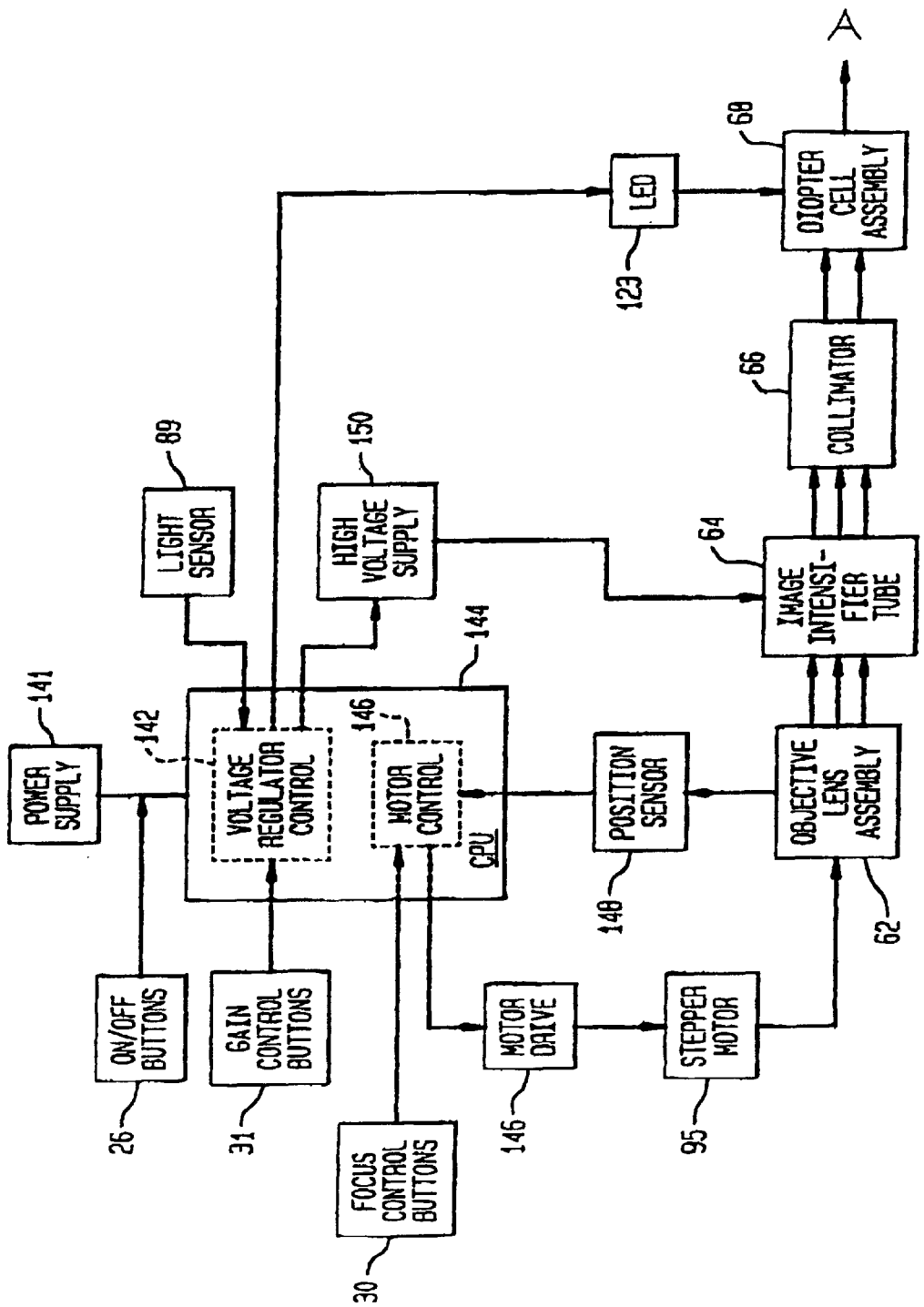
FIG. 8 is a block diagram illustrating the electrical operations of the present invention binocular assembly.

Referring to FIG. 8, there is shown a block diagram detailing the operational logic for the electrical components of the present invention night vision binoculars. As has been previously described, the optical components of the night vision binoculars include an objective lens assembly 62, and an image intensifier tube 64, a collimator lens assembly 66 and at least one diopter cell assembly 68. In the preferred embodiment, the night vision binoculars are a self contained transportable unit. As such, the power supply 141 to the binoculars are preferably batteries (224 of FIG. 2). Referring to FIG. 2, a battery housing compartment 223 in the bottom half section 20 accommodates a battery 224. The battery 224 is held in the housing compartment 223 by a cover 225 having a flange 226 and gasket which seals the battery within the compartment 223. The battery terminals are connected to terminals 228 and 228 which in turn operate to power the electronic components. The batteries can be disposable or rechargeable and are preferably widely commercially available. The on/off operation of the power supply 141 is controlled by the tactile manipulation of the on/off button 38 that is operational from the exterior of the binocular housing.

Referring again to FIG. 8a or suitable programmed logic array (PLA or PLD) controls the electrical operation of the night vision binoculars. The C.P.U. 144 is contained within the circuit board assembly 38 previously shown in FIG. 2. Although several other functions may be incorporated, the C.P.U. 144 serves primarily as a voltage regulator control 142 a motor control 146 and brightness operative. A high voltage supply 150 is coupled to the C.P.U. 144. The C.P.U. 144 directs current from the power supply 141 to the high voltage supply 150, where the initial six volt power supply is amplified to the voltage requirements of the components within the image intensifier tube 64. The voltage requirements of various image intensifier tubes are well known in the art and need not be disclosed in detail herein. Gain control buttons 31 are coupled to the C.P.U. 144. The gain control buttons 31 control the operation of the high voltage supply 150. As a result, by manipulating the gain control buttons 31, the voltages supplied to the different components of the image intensifier tube 64 can be changed. By varying the voltages supplied to the image intensifier tube 64 the gain of the tube can be controlled, thereby controlling the brightness of the image that the image intensifier tube 64 produces.

The light sensor 65 is coupled to the C.P.U. 144. The light sensor 65 detects the intensity of light that is impinging upon objective lens assembly 62. The C.P.U. 144 reads the signal from the light sensor 65 and automatically adjusts the gain of the image intensifier tube 64 to optimize the contrast of the image being viewed. Furthermore, the C.P.U. 144 compares the signal from the light sensor 65 to a predetermined threshold valve. If the light sensor 65 detects a light intensity greater than the threshold valve, the gain controller 144 can deactivate the image intensifier tube 64 to prevent damage to the image intensifier tube 64.

As has been previously described, the objective lens assembly 62 is coupled to stepper motor 95 that is capable of focusing the objective lens assembly 62 between an infinite conjugate and a conjugate of one meter. The operation of the stepper motor 95 is controlled by the motor drive 146. The C.P.U. 144, via the motor drive 146, automatically focuses the objective lens assembly 62 to an infinite conjugate each time the night vision binoculars are turned on. Such an automatic adjustment is made utilizing a position sensor 148 that is coupled to the objective lens assembly 62. The position sensor 148 signals the C.P.U. 144, thereby deactivating the motor drive 146 when the objective lens assembly 62 is properly focused at an infinite conjugate. Adjustments away from the infinite conjugate are made via the focus control buttons 30 that cause the motor drive 146 to advance the stepper motor 95 and change the position of the objective lens assembly 62.

An LED 123 is disposed in the diopter cell assembly 68 in a manner that enables the light from the LED to be viewed by the viewer. The LED 132 is coupled to the C.P.U. 144 and lights when the power supply 141 is drained, thereby indicating that the batteries are low to the viewer.

The above described night vision binocular device enables the amplification of light up to 20,000 times for optimum night viewing. The power focus and interpupillary adjustment ensure easy and simple operation. The apparatus with the battery is light and a typical device weighs less than 30 ounces and can float. The device is battery operated, provides a 40 degree flied of view (FOV) and has an automatic shut off to protect the image intensifier. The device is 7¾" (length) 5½" (width) and 2⅗" (height). The casing is waterproof and impact resistant.

It will be understood that the night vision binocular assembly described herein is merely exemplary and that a person skilled in the art may make many variations and modifications to the described embodiments utilizing functionally equivalent components to those described. All such variations and modifications are intended to be included within the scope of this invention as defined by the appended claims.

What is claimed is:

1. A waterproof electronic assembly comprising:

a housing having an internal hollow made from a fluid impervious material, and at least one button aperture located on a surface thereof;

at least one circuit board disposed in said housing hollow and having at least one tactile controlled element located thereon that is positioned below said button aperture;

an elastomeric member disposed between said circuit board and said housing, said elastomeric member being sealed to said housing within said hollow, wherein said elastomeric member has a projecting portion which extends through said button aperture to enable said tactile control element to be activated by depressing said projecting portion through said button aperture; and means for fastening said circuit board to said housing, wherein said circuit board contacts said elastomeric member and compresses said member against said housing to enable a fluid impervious seal to be formed about said button aperture.

2. The assembly according to claim 1, wherein said button aperture comprises a plurality of button apertures and said projecting portion comprises a plurality of projecting portions, each of said projection portions extending through a corresponding one of said button apertures, said elastomeric member being a single unistructural member.

3. The assembly according to claim 2, wherein at least one of said projecting portions has indicia formed thereon, said indicia identifiable by a person engaging said projecting portions through said button apertures.

4. A waterproof electronic assembly comprising:

a housing having an internal hollow and at least one button aperture communicating with said internal hollow;

at least one circuit board disposed in said hollow of said housing, said circuit board having at least one tactile controlled element located thereon that is positioned below said button aperture of said housing; and an elastomeric member disposed in said hollow of said housing, said elastomeric member having a projecting portion which extends through said button aperture above said tactile control element for activating said tactile control element, wherein said elastomeric member forms a fluid impervious seal about said button aperture.

5. The assembly according to claim 4, wherein said button aperture comprises a plurality of button apertures and said projecting portion comprises a plurality of projecting portions, each of said projection portions extending through a corresponding one of said button apertures.

6. The assembly according to claim 4, wherein said elastomeric member and said projecting portion form a unitary member.

7. The assembly according to claim 4, wherein said projecting portion includes identifying indicia.

* * * * *